(12) United States Patent
Furihata

(10) Patent No.: US 6,309,081 B1
(45) Date of Patent: Oct. 30, 2001

(54) BACKLIGHT UNIT AND ELECTRONIC APPARATUS

(75) Inventor: Shinichi Furihata, Nagano (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/383,799

(22) Filed: Aug. 26, 1999

(30) Foreign Application Priority Data

Aug. 27, 1998 (JP) .................................................. 10-242357

(51) Int. Cl.[7] ........................................................ F21V 8/00
(52) U.S. Cl. .................................. 362/31; 362/26; 349/65
(58) Field of Search ........................... 362/26, 31, 396, 362/27, 260; 349/58, 60, 65, 67, 70

(56) References Cited

U.S. PATENT DOCUMENTS

| | | | |
|---|---|---|---|
| 5,211,464 | * | 5/1993 | Bohmer .................................. 362/31 |
| 5,497,293 | * | 3/1996 | Noguchi et al. ........................ 362/26 |
| 5,558,420 | * | 9/1996 | Oki et al. ................................ 362/31 |
| 5,590,947 | * | 1/1997 | Kidd, Jr. ................................. 362/31 |
| 5,815,227 | * | 9/1998 | Lu .......................................... 362/31 |

* cited by examiner

Primary Examiner—Y. Quach
(74) Attorney, Agent, or Firm—Harness, Dickey & Pierce, P.L.C.

(57) ABSTRACT

To achieve considerably simple and easy replacement of a fluorescent tube 10 in a backlight unit, a fluorescent tube 10 is provided at both ends with a bracket 12. The fluorescent tube 10 is inserted in a cylindrical portion 12b of the bracket 12 having an outer diameter that is substantially equal to the inner diameter of a gripper 300, thereby preventing a lead portion from being exposed. The gripper 300, which is made of plastic, metal, or the like, wraps the cylindrical portion 12b to cover the fluorescent tube 10 with its reflective surface, and also grips an end portion of a light guide plate 20. This structure allows the gripper 300 to be simply attached and detached, and maintains a predetermined positional relationship among the fluorescent tube 10, the reflecting surface of the gripper 300, and the light guide plate 20.

29 Claims, 6 Drawing Sheets

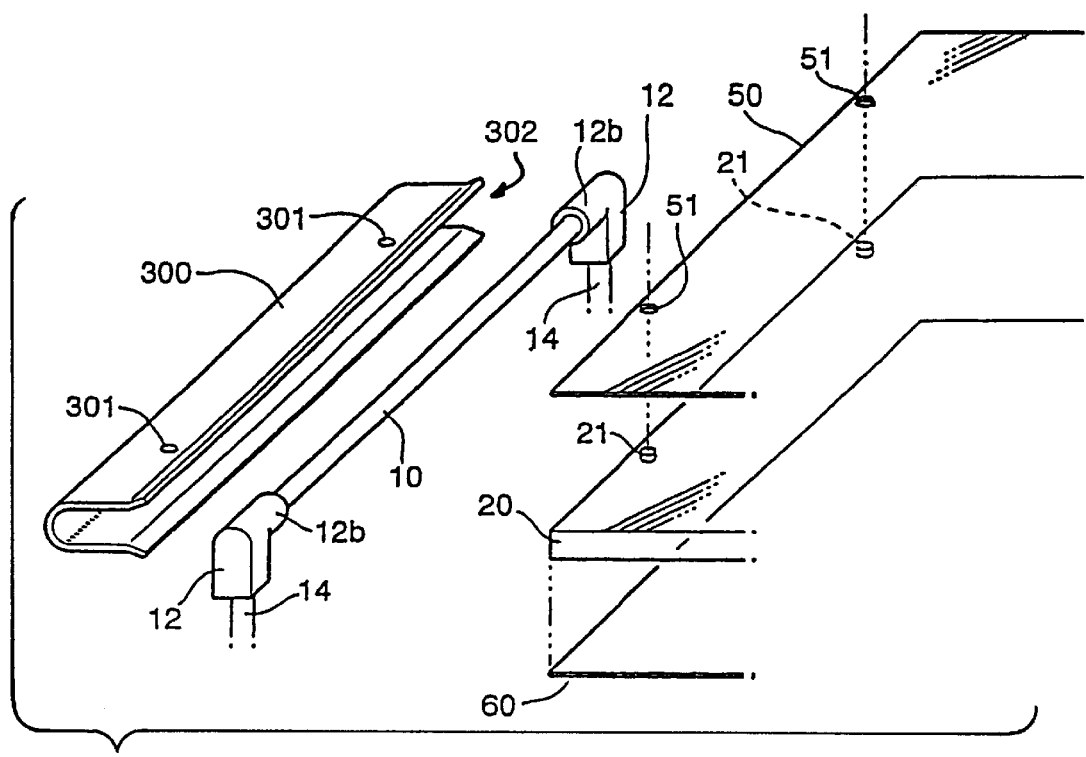
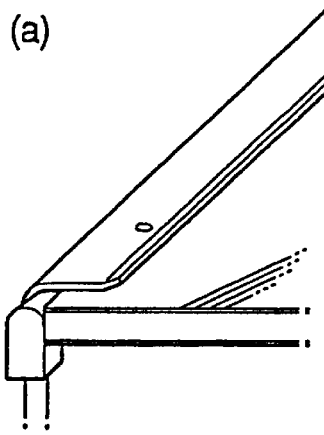
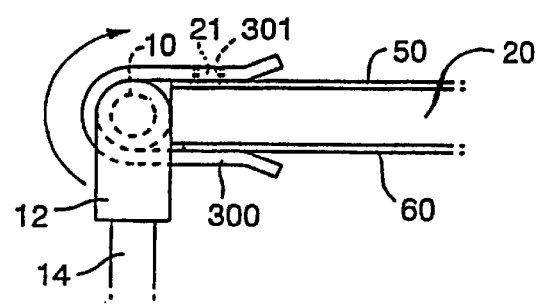
Fig. 1 (a)
Fig. 1 (b)
Fig. 1 (c)

Prior Art

BACKLIGHT UNIT AND ELECTRONIC APPARATUS

BACKGROUND OF THE INVENTION

1. Industrial Field of the Invention

The present invention relates to a backlight unit which achieves considerably simple and easy replacement of a line light source, such as a fluorescent tube, that must maintain a predetermined positional relationship with respect to a light guide plate or the like, and relates to an electronic apparatus using the backlight unit.

2. Description of the Related Art

As is generally known, liquid crystal display apparatus are used in many display apparatus for use in information apparatus, such as notebook personal computers, because they feature light weight, thin profile, and low power consumption. In recent years, liquid crystal display apparatus having a backlight unit built therein have become dominant with improvements in brightness and colorization in liquid crystal display screens, and for other reasons. The backlight units are roughly classified into the direct-lighting type using a reflecting curtain or the like, and the edge-lighting type using a light guide plate. In most notebook personal computers and the like, edge-lighting type backlight units are adopted because of a strong demand for thinner profiles.

A description will now be given of the structure of a conventional edge-lighting type backlight unit. FIG. 6(*a*) is a plan view showing the structure of the backlight unit, and FIG. 6(*b*) is a side view thereof. As shown in these figures, in the edge-lighting type backlight unit, a fluorescent tube 10 is placed on the side of a light guide plate 20, and is wrapped in a reflecting film 30 so that light emitted therefrom is effectively guided to the light guide plate 20. The reflecting film 30 is made of, for example, a PET (polyethylene terephthalate) evaporated with a high-reflectance metal film of silver, aluminum, or the like, a simply white PET, or the like, and both ends thereof are adhered to the upper and lower (front and back) surfaces of the light guide plate 20 by double-sided adhesive tapes 40.

A diffusing plate 50 and a reflecting plate 60 are provided on the upper and lower surfaces of the light guide plate 20, respectively, and are adhered by a tape 70 or the like to the side portion of the light guide plate 20 opposite from the side portion where the fluorescent tube 10 is placed. The diffusing plate 50 and the reflecting plate 60 are not adhered onto the entire surface of the light guide plate 20, but only to one surface thereof in order to prevent warp resulting from the difference in coefficients of thermal expansion.

In general, the fluorescent tube 10 has the shortest service life among the respective components of the liquid crystal display apparatus. For this reason, there has been a demand for a structure that allows the fluorescent tube 10 to be simply and easily replaced.

In the conventional backlight unit shown in the figure, however, since the reflecting film 30 is adhered to the light guide plate 20, it is impossible to simply and easily replace the fluorescent tube 10. That is, it is significantly troublesome to perform operations of peeling the reflecting film 30 off the light guide plate 20, replacing the fluorescent tube 10, and subsequently adhering the reflecting film 30 again to the light guide plate 20. Moreover, the reflecting film 30 may be creased during replacement.

When the fluorescent tube 10 is placed close to the light guide plate 20 or the reflecting film 30, abnormalities may occur in lighting characteristics. For this reason, spacers SP or the like are sometimes provided to place the fluorescent tube 10 in a predetermined positional relationship with respect to the side portion of the light guide plate 20 and the reflecting surface of the reflecting film 30. This further complicates the operation of replacing the fluorescent tube 10.

The present invention has been made in view of the above problems, and it is accordingly an object of the present invention to provide a backlight unit which achieves considerably simple and easy replacement of a fluorescent tube that must maintain a predetermined positional relationship with respect to a light guide plate or the like, and to provide an electronic apparatus using the backlight unit.

SUMMARY OF THE INVENTION

In order to achieve the above object, the present invention comprises a line light source for emitting light, a light guide plate for making the light from the line light source uniform, and a gripper for covering the line light source with a reflective surface and for gripping an end portion of the light guide plate.

According to this structure, the gripper covers the line light source, such as a fluorescent tube, with a reflective surface, and grips the end portion of the light guide plate. Since this facilitates attachment and detachment of the gripper to the light guide plate, it is possible to simply and easily replace the line light source such as a fluorescent tube.

In this case, it is preferable that the light guide plate and the gripper be provided with a positioning mechanism for forming a predetermined positional relationship therebetween. As the positioning mechanism, it may be possible to form a projection in one of the light guide plate and the gripper and to form a recess or a hole in the other so as to be engaged with the projection, or to form a cutout portion in the light guide plate and to shape the gripper so as to engage with the cutout portion.

In the case in which the light guide plate and the gripper are provided with the positioning mechanism for forming a predetermined positional relationship therebetween, it is preferable that the line light source be covered at both ends with a spacer having a diameter that is larger than the outer diameter of the line light source and is smaller than the inner diameter of the gripper for covering the line light source. According to this structure, the gripper is placed in a predetermined positional relationship with respect to the light guide plate, and the line light source is also placed in a predetermined positional relationship with the respect to the gripper and the light guide plate. In this case, it is most preferable that the outer diameter of the spacer be substantially equal to the inner diameter of the gripper. Furthermore, when the spacer is formed by a bracket for protecting a lead portion of the line light source, it can also function as a mechanism for positioning the line light source.

An electronic apparatus of the present invention comprises a line light source for emitting light, a light guide plate for making the light from the line light source uniform, a gripper for covering the line light source with a reflective surface and for gripping an end portion of the light guide plate, and a liquid crystal display panel including liquid crystal sandwiched between a pair of substrates, the liquid crystal display panel being disposed on the emitting side of the light guide plate.

BRIEF DESCRIPTION OF THE DRAWINGS

FIG. 1(*a*) is an exploded perspective view showing the structure of a backlight unit according to an embodiment of the present invention;

FIG. 1(b) is a perspective view showing the external structure of the backlight unit;

FIG. 1(c) is a side view showing the structure of the principal part of the backlight unit;

DESCRIPTION OF THE EMBODIMENTS

Embodiments of the present invention will be described below with reference to the drawings. FIG. 1(a) is an exploded perspective view showing the structure of a backlight unit according to an embodiment of the present invention, FIG. 1(b) is a perspective view showing the external structure of the backlight unit, and FIG. 1(c) is a side view showing the structure of the principal part of the backlight unit.

Figure 6:
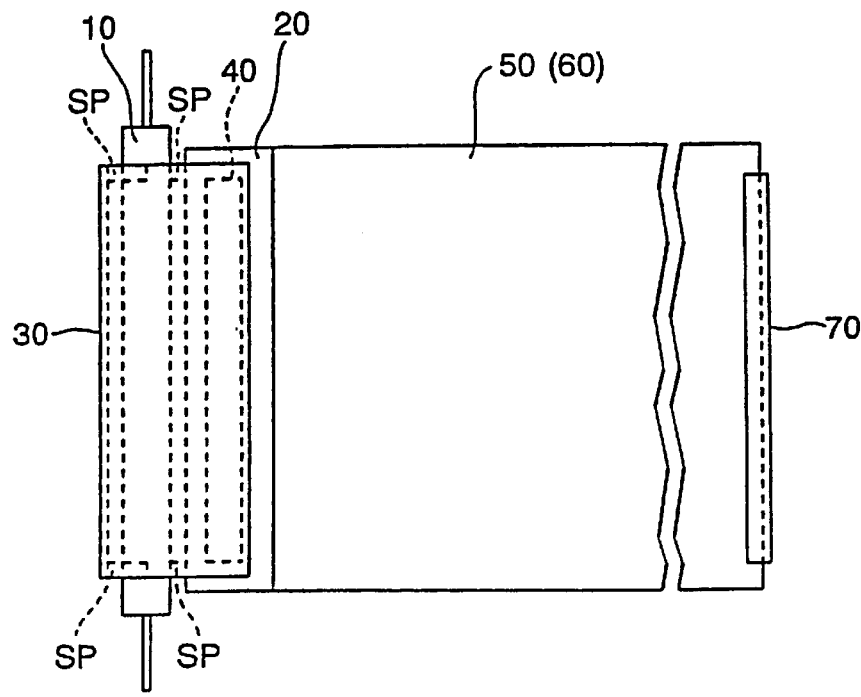
FIG. 6(a) is a plan view showing the structure of a conventional backlight unit.
FIG. 6(b) is a side view of the conventional backlight unit.
Figure 6:
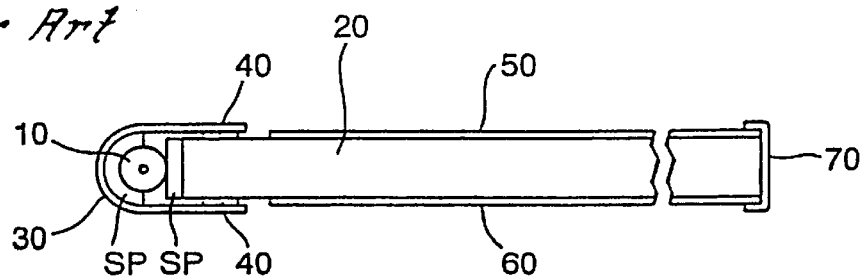

As shown in these figures, projections 21 are provided at two positions on the upper surface of a light guide plate 20 near the end where a fluorescent tube 10 is placed, and holes 51, through which the projections 21 penetrate, are formed at two positions in a diffusing plate 50. This embodiment is different from the conventional art in that the diffusing plate 50 and a reflecting plate 60 are aligned at one end with the side end of the light guide plate 20 where the fluorescent tube 10 is placed, and are not adhered by the tape 70 (see FIGS. 6A and 6B) or the like.

Figure 2:
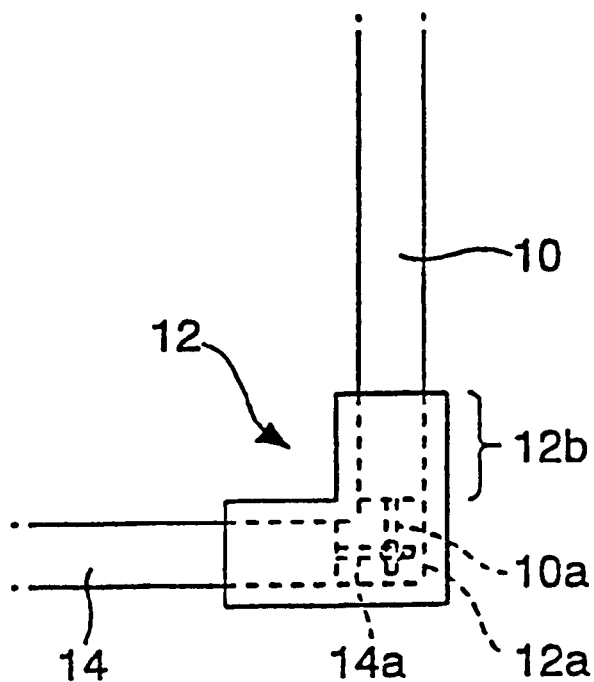
FIG. 2(a) is a plan view showing the structure of a bracket in the backlight unit.
FIG. 2(b) is a side view of the structure of the bracket in the backlight unit.
Figure 2:
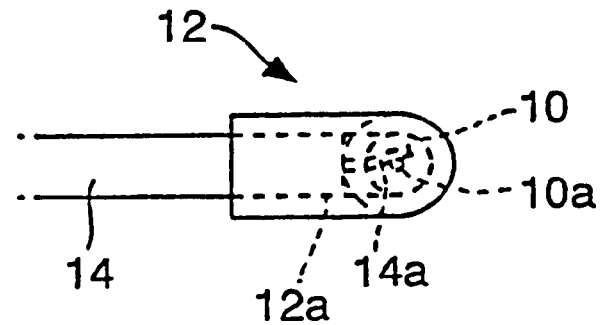

The fluorescent tube 10 is provided with spacers, such as brackets 12 at both ends thereof. The structure of the bracket 12 will now be described with reference to FIG. 2. FIG. 2(a) is a plan view showing the structure of the bracket 12, and FIG. 2(b) is a side view thereof. As shown in these figures, the bracket 12 is substantially L-shaped, and has a cavity 12a therein. The fluorescent tube 10 is inserted in one end of the bracket 12, and a cord 14 is inserted in the other end. In the cavity 12a, a lead portion 10a of the fluorescent tube 10 and a conductor portion 14a of the cord 14 are soldered to each other. The bracket 12 having such a structure prevents the lead portion 10a of the fluorescent tube 10 from being exposed. Furthermore, a portion 12b of the bracket 12, in which the fluorescent tube 10 is inserted, is shaped like a cylinder.

It is preferable that such a bracket 12 be made of a material having both flexibility and insulating ability, such as rubber. The structure shown is obtained, for example, by the following steps. That is, first, the bracket 12 is deformed, and the cord 14 is passed through the cavity 12a. Second, the lead portion 10a of the fluorescent tube 10 and the conductor portion 14a of the cord 14 are soldered to each other. Third, unnecessary portions of the lead portion and the conductor portion 14 are cut off. Fourth, the bracket 12 is moved, and the fluorescent tube 10 is inserted in the cylindrical portion 12b. The structure shown is thereby obtained.

Referring again to FIG. 1(a), a gripper 300 is made of plastic, metal, or the like, and is formed by stiffening a conventional reflective film. That is, the end face of the gripper 300 is substantially U-shaped, and the inner surface thereof is provided with a high-reflectance metal film, such as silver or aluminum, by evaporation, plating, or by other means. The gripper 300 is also provided with two holes 301 to be engaged with the projections 21 of the light guide plate 20, and an end portion 302 is slightly opened for easy attachment and detachment. Namely, the end portion 302 opening is flared outwardly. The inner diameter of the gripper 300 is substantially equal to the outer diameter of the cylindrical portion 12b of the bracket 12.

The gripper 300 having such a structure wraps the cylindrical portions 12b of the brackets 12 at both ends thereof, and clamps the end of the light guide plate 20 while clamping the diffusing plate 50 and the reflecting plate 60 so that the holes 301 are engaged with the projections 21, as shown in FIGS. 1(b) and 1(c). Since the cylindrical portions 12b of the brackets 12 serve as spacers, the fluorescent tube 10 is placed at the side end of the light guide plate 20 so that there is no direct contact with the inner surface of the gripper 300, which serves as a reflecting surface, and the light guide plate 20, while being covered with the gripper 300. In this case, the portions of the brackets 12 other than the cylindrical portions 12b are not wrapped by the gripper 300.

According to the backlight unit thus constructed, since the gripper 300 is simply fixed to the light guide plate 20 only by a clamping force, it can be easily attached to and detached from the light guide plate 20. For this reason, replacement of the fluorescent tube 10 is simple and easy. In this case, replacement is further facilitated by replacing the brackets 12 and the cords 14 with the fluorescent tube 10 as a unit.

The engagement between the holes 301 and the projections 21 allows the gripper 300 to consistently maintain the same positional relationship with respect to the light guide plate 20. Furthermore, since the cylindrical portions 12b of the brackets 12 serve as spacers, the fluorescent tube 10 consistently maintains the same positional relationship with respect to the gripper 300 and the light guide plate 20. That is, the fluorescent tube 10, the light guide plate 20, and the gripper 300 can be held in the same positional relationship even when the gripper 300 is subjected to repeated attachment and detachment for replacing the fluorescent tube 10.

In addition, since the portions 12b of the brackets 12 that serve as spacers are cylindrical, the brackets 12 and the cords 14 are allowed to turn, as shown in FIG. 1(c), even when the gripper 300 is clamping the light guide plate 20. This means that the cords 14 can be easily routed in incorporating the backlight unit into an electronic apparatus. Furthermore, since the gripper 300 clamps the diffusing plate 50 and the reflecting plate 60 with the light guide plate 20 located therebetween, there is no need to adhere the diffusing plate 50 and the reflecting plate 60 to the light guide plate 20.

While the projections 21 and the holes 301 are provided only on the side of the light guide plate 20 and the gripper 300, respectively, where the diffusing plate 50 is placed, in the above-described embodiment, they may be, of course, also provided on the side where the reflecting plate 60 is placed.

In such a backlight unit, various methods other than the above embodiment may be possible in order to position the gripper 300 with respect to the light guide plate 20. For example, in contrast to the embodiment shown in FIG. 1(a), the light guide plate 20 may be provided with recesses, and the gripper 300 may be provided with projections to be engaged therewith.

Figure 3:
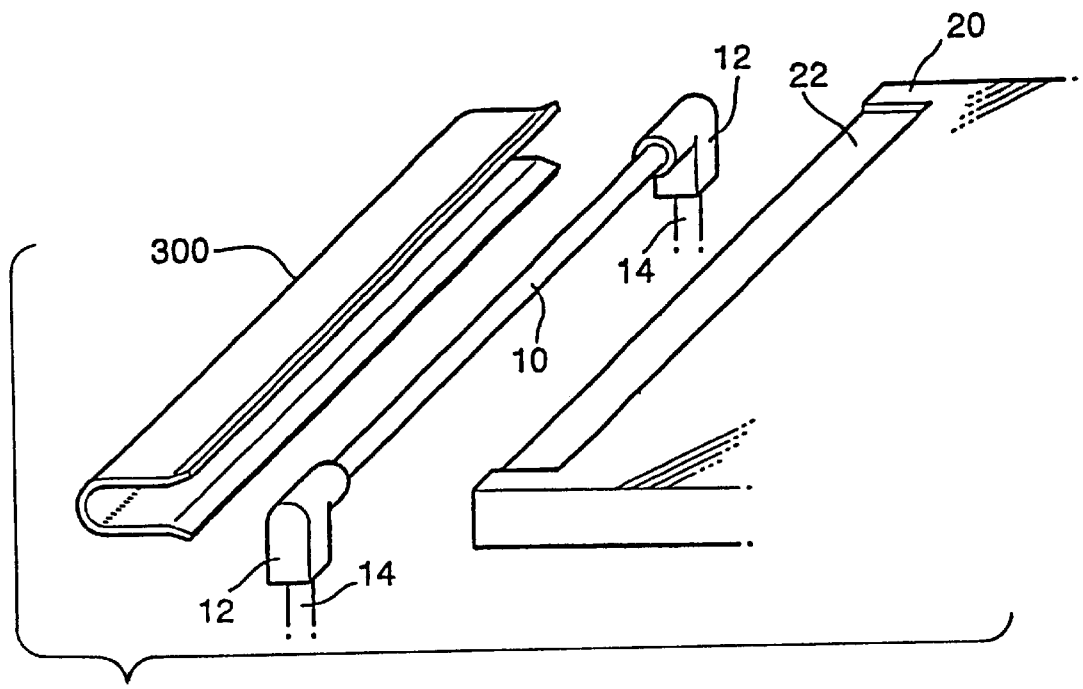
FIG. 3(a) is an exploded perspective view showing the structure of a backlight unit according to another embodiment of the present invention.
FIG. 3(b) is a perspective view showing the external structure of the backlight unit.
FIG. 3(c) is a side view showing the structure of the principal part of the backlight unit.
Figure 3:
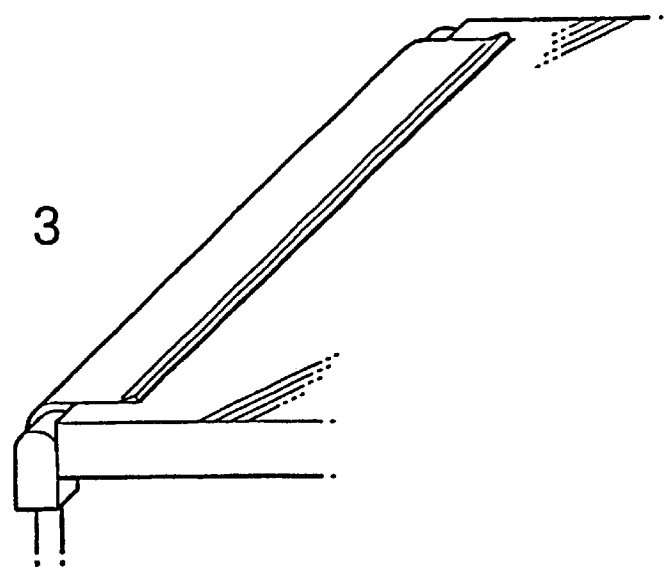
Figure 3:
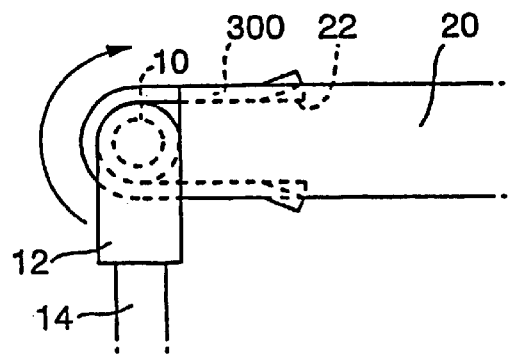

As shown in FIGS. 3(a) to 3(c), cutout portions 22, which conform to the shape of the gripper 300, may be formed at the ends of the front and back sides of the light guide plate 20 so as to be clamped by the gripper 300. Since this structure is not suited to simultaneously clamp the diffusing plate 50 and the reflecting plate 60 (see FIGS. 1(a) to 1(c)), however, the diffusing plate 50 and the reflecting plate 60 are adhered by a tape or the like, as conventionally, to the side end of the light guide plate 20 opposite from the side end where the fluorescent tube 10 is placed.

Next, a description will be given of examples in which the above-described backlight unit is applied to electronic apparatuses.

Figure 4:
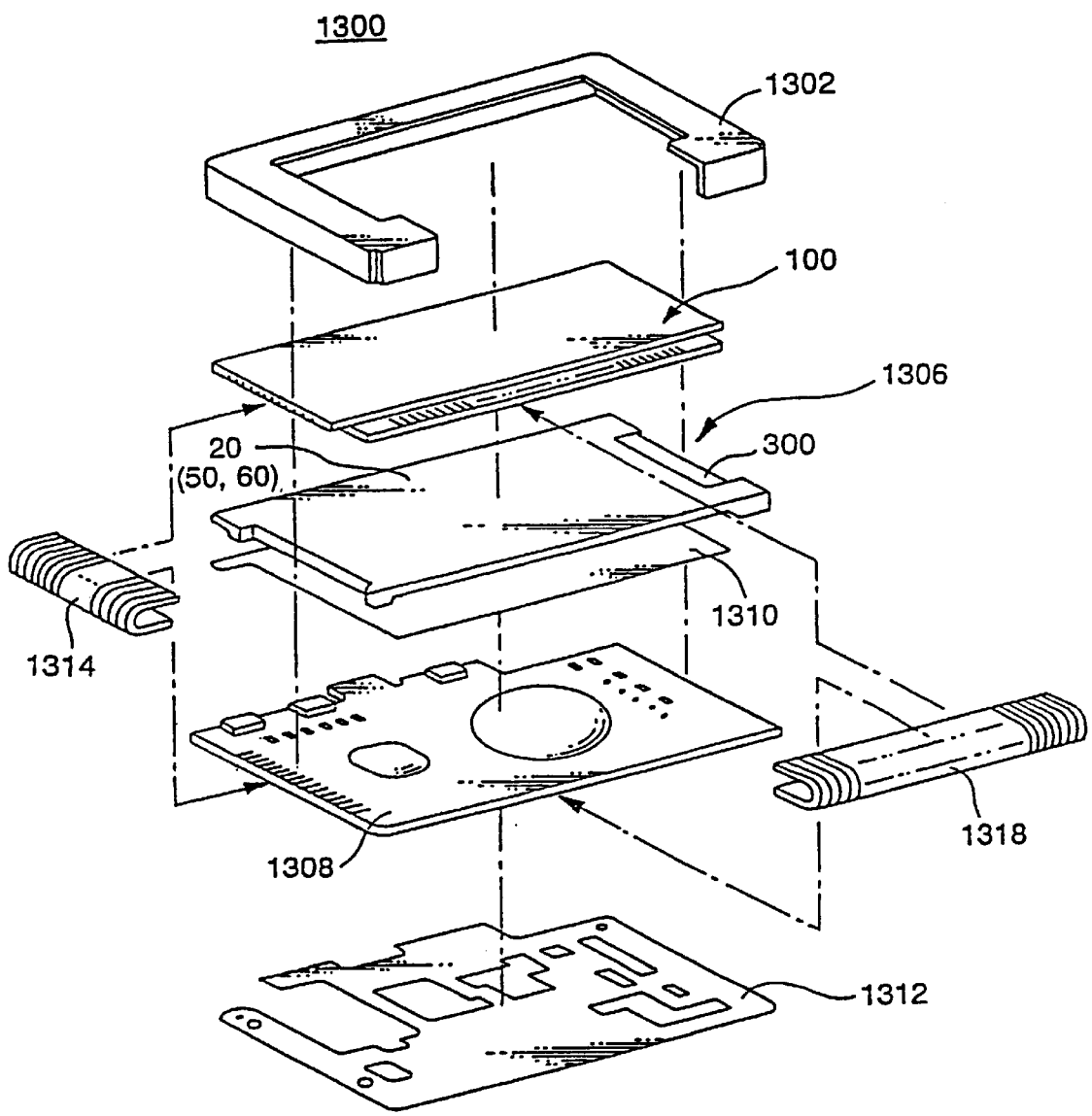
FIG. 4 is an exploded perspective view showing the configuration of a pager as an electronic apparatus to which the backlight unit of the embodiment is applied.

First, a pager will be described which uses a backlight unit as a surface-emitting light source for emitting light from the back of a liquid crystal display panel. FIG. 4 is an exploded perspective view showing the configuration of the pager. As shown in this figure, a pager 1300 includes, in a metal frame 1302, a liquid crystal display panel 100 composed of two substrates, and a backlight unit 1306 disposed on the back thereof. In the backlight unit 1306, a gripper 300 clamps a diffusing plate 50 and a reflecting plate 60 together with a light guide plate 20, as described above. Moreover, emitted light from the backlight unit 1306 is blocked/transmitted by a plurality of pixels in the liquid crystal display panel 100, thereby producing a predetermined display.

The metal frame 1302 also contains a circuit board 1308, and first and second shielding plates 1310 and 1312 in addition to the liquid crystal display panel 100 and the backlight unit 1306. In this configuration, the circuit board 1308 is electrically connected to an upper substrate in the liquid crystal display panel 100 via a film tape 1314, and to a lower substrate via a film tape 1318.

Figure 5:
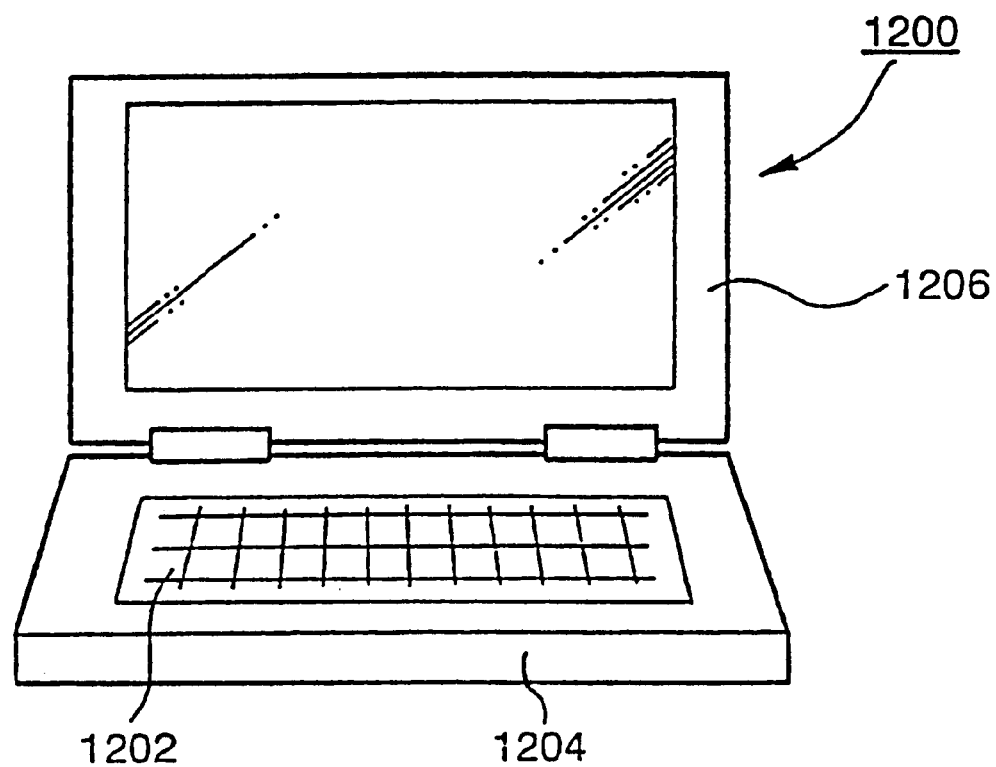
FIG. 5 is a schematic view of a mobile personal computer as an electronic apparatus to which the backlight unit of the embodiment is applied.

Next, a description will be given of a mobile computer that similarly uses this backlight unit as a surface-emitting light source for emitting light from the back of a liquid crystal display panel. FIG. 5 is a front view showing the configuration of this computer. In the figure, a computer 1200 comprises a main body 1204 including a keyboard 1202, and a liquid crystal display apparatus 1206. This liquid crystal display apparatus 1206 is constructed by placing the backlight unit of the present invention on the back of the liquid crystal display panel 100, as described above with reference to FIG. 4.

As examples of electronic apparatuses other than the electronic apparatuses that have been described with reference to FIGS. 4 and 5, there may be mentioned a liquid crystal television, viewfinder type and monitor-direct-view type video tape recorders, a car navigation apparatus, an electronic notebook, a pocket calculator, a word processor, a workstation, a portable telephone, a video telephone, a POS terminal, an apparatus having a touch panel, and the like.

As described above, according to the present invention, in a backlight unit in which a line light source, such as a fluorescent tube, must maintain a predetermined positional relationship with respect to a light guide plate, it is possible to make the replacement of the line light source considerably simple and easy.

What is claimed is:

1. A backlight unit comprising:
   a line light source having an end and being capable of emitting a light;
   a light guide plate having a side portion disposed generally adjacent to said line light source, said light guide plate being adaptable for making the light emitted from said line light source uniform;
   a gripper disposed around said line light source and coupled to said side portion of said light guide plate, said gripper having a reflective surface for covering said line light source; and
   a spacer disposed on the end and having a diameter that is larger than an outer diameter of said line light source and smaller than an inner diameter of said gripper,
   wherein the spacer is formed by a bracket for protecting a lead portion of said line light source.

2. The backlight unit according to claim 1, wherein a positioning mechanism is provided for forming a predetermined positional relationship between said light guide plate and said gripper.

3. The backlight unit according to claim 2, wherein said positioning mechanism includes a projection formed on said light guide plate and a recess or a hole formed in said gripper, wherein said projection and said recess or hole are adaptable for engagement.

4. The backlight unit according to claim 2, wherein said positioning mechanism includes a projection formed on said gripper and a recess or a hole formed in said light guide plate, wherein said projection and said recess or hole are adaptable for engagement.

5. The backlight unit according to claim 2, wherein said positioning mechanism includes a cutout portion formed in said light guide plate, and said gripper is shaped to engage with said cutout portion.

6. An electronic apparatus comprising:
   a line light source having an end and being capable of emitting a light;
   a light guide plate having a side portion disposed generally adjacent to said line light source, said light guide plate being adaptable for making the light from said line light light uniform;
   a gripper disposed around said line light source and coupled to said side portion of said light guide plate, said gripper having a reflective surface for covering said line light source;
   a spacer disposed on the end and having a diameter that is larger than an outer diameter of said line light source and smaller than an inner diameter of said gripper; and
   a liquid crystal display panel including liquid crystal sandwiched between a pair of substrates, said liquid crystal panel being disposed on an emitting side of said light guide plate,
   wherein the spacer is formed by a bracket for protecting a lead portion of said line light source.

7. A backlight unit comprising:
   an elongated light source;
   a light guide plate disposed adjacent to said elongated light source;
   a U-shaped clamp having an inner reflective surface wrapped about said elongated light source and coupled to said light guide plate; and
   a spacer disposed between said elongated light source and said light guide plate, wherein said spacer includes a bracket having an opening formed therein for receiving an end of said elongated light source.

8. The backlight unit of claim 7 wherein said bracket includes a second opening for receiving a power cord therein for powering said elongated light source.

9. The backlight unit of claim 7 wherein said U-shaped clamp includes an end portion opening which is flared outwardly.

10. The backlight unit of claim 7 wherein said U-shaped clamp farther comprises a stiffened reflective film.

11. The backlight unit of claim 7 further comprising a diffusing plate disposed between said U-shaped clamp and said light guide plate.

12. The backlight unit of claim 7 further comprising a reflective plate disposed between said U-shaped clamp and said light guide plate.

13. The backlight unit of claim 7 wherein said elongated light source further comprises a florescent tube.

14. The backlight unit of claim 7 further comprising a positioning mechanism interconnecting said U-shaped clamp and said light guide plate.

15. The backlight unit of claim 14 wherein said positioning mechanism further comprises at least one projection formed in one of said U-shaped clamp and said light guide plate and at least one complementary recess formed in another of said U-shaped clamp and said light guide plate.

16. The backlight unit of claim 14 wherein said positioning mechanism further comprises a cut-out portion of said light guide plate for receiving said U-shaped clamp.

17. The backlight unit of claim 7 wherein said spacer is also disposed between said elongated light source and said U-shaped clamp.

18. A backlight unit comprising:

light source including an elongated portion and a lead, the lead being attached to an end of the elongated portion;

a light guide plate including a side portion positioned to face the light source;

a gripper coupled to the light guide plate and enclosing the light source; and a spacer forming a positional relationship between the gripper and the light source, wherein the spacer covers the lead.

19. The backlight unit according to claim 18, wherein the spacer holds the light source.

20. The backlight unit according to claim 18, further comprising;

a cord connected to the lead, wherein the cord is inserted in the spacer and is connected to the lead in the spacer.

21. The backlight unit according to claim 20, wherein the spacer is substantially L-shaped.

22. The backlight unit according to claim 20, wherein the spacer has flexibility and insulating ability.

23. The backlight unit according to claim 18, wherein one of the light guide plate and the gripper includes a projection, wherein the other of the light guide plate and the gripper includes one of a recess or hole, the projection and the hole or the recess being connected with each other.

24. An electronic apparatus comprising:

a light source including an elongated portion and a lead, the lead being attached to an end of the elongated portion;

a light guide plate including a side portion positioned to face the light source;

a gripper coupled to the light guide plate and enclosing the light source;

a spacer forming a positional relationship between the gripper and the light source; and a liquid crystal display panel including liquid crystal sandwiched between a pair of substrates, said liquid crystal display panel being disposed on an emitting side of the light guide plate, wherein the spacer covers the lead.

25. The electronic apparatus according to claim 24, wherein the spacer holds the light source.

26. The electronic apparatus according to claim 24, further comprising:

a cord connected to the lead, wherein the cord is inserted in the spacer and is connected to the lead in the spacer.

27. The electronic apparatus according to claim 26, wherein the spacer is substantially L-shaped.

28. The electronic apparatus according to claim 26, wherein the spacer has flexibility and insulating ability.

29. The electronic apparatus according to claim 24, wherein one of the light guide plate and the gripper includes a projection, wherein the other of the light guide plate and the gripper includes one of a recess or hole, the projection and the hole or the recess being connected with each other.

* * * * *

UNITED STATES PATENT AND TRADEMARK OFFICE
CERTIFICATE OF CORRECTION

PATENT NO. : 6,309,081 B1
DATED : October 30, 2001
INVENTOR(S) : Shinichi Furihata It is certified that error appears in the above-identified patent and that said Letters Patent is hereby corrected as shown below:

<u>Column 6,</u>
Line 44, delete (second occurrence) "light" and insert -- source -- thereof.

<u>Column 7,</u>
Line 11, "farther" should be -- further --.
Line 48, "comprising;" should be -- comprising: --.

Signed and Sealed this

Nineteenth Day of March, 2002

Attest:

JAMES E. ROGAN
*Director of the United States Patent and Trademark Office*

*Attesting Officer*